US006977627B1

(12) United States Patent
    Dalton

(10) Patent No.: US 6,977,627 B1
(45) Date of Patent: Dec. 20, 2005

(54) ELECTRONIC SIGN WITH OPPOSITELY FACING ELECTRONIC DISPLAYS

(75) Inventor: Gary C. Dalton, Snellville, GA (US)

(73) Assignee: NCR Corporation, Dayton, OH (US)

( * ) Notice: Subject to any disclaimer, the term of this patent is extended or adjusted under 35 U.S.C. 154(b) by 387 days.

(21) Appl. No.: 10/270,938

(22) Filed: Oct. 15, 2002

(51) Int. Cl.[7] ............................................. G09G 5/00
(52) U.S. Cl. ...................................... 345/1.1; 345/905
(58) Field of Search ........................... 345/1.1, 905, 4; 361/681

(56) References Cited

U.S. PATENT DOCUMENTS

| 5,701,695 | A | * | 12/1997 | Current ................... 40/606.14 |
| 5,722,048 | A | * | 2/1998  | Javitt ....................... 455/501 |
| 5,854,474 | A |   | 12/1998 | Goodwin, III |
| 5,856,819 | A | * | 1/1999  | Vossler ..................... 345/102 |
| 5,911,525 | A | * | 6/1999  | Jepsen et al. ............. 40/611.06 |
| 6,499,704 | B2 | * | 12/2002 | Oddsen, Jr. ............. 248/125.1 |
| 6,801,185 | B2 | * | 10/2004 | Salley ..................... 345/102 |

* cited by examiner

Primary Examiner—Richard Hjerpe
Assistant Examiner—Rodney Amadiz
(74) Attorney, Agent, or Firm—Paul W. Martin

(57) ABSTRACT

An electronic sign which is particularly suited for end aisles, large merchandise, and the like. The electronic sign includes a frame, first and second displays in the frame which face opposite directions, a base for supporting the frame, and control circuitry for causing the first and second displays to display information.

20 Claims, 3 Drawing Sheets

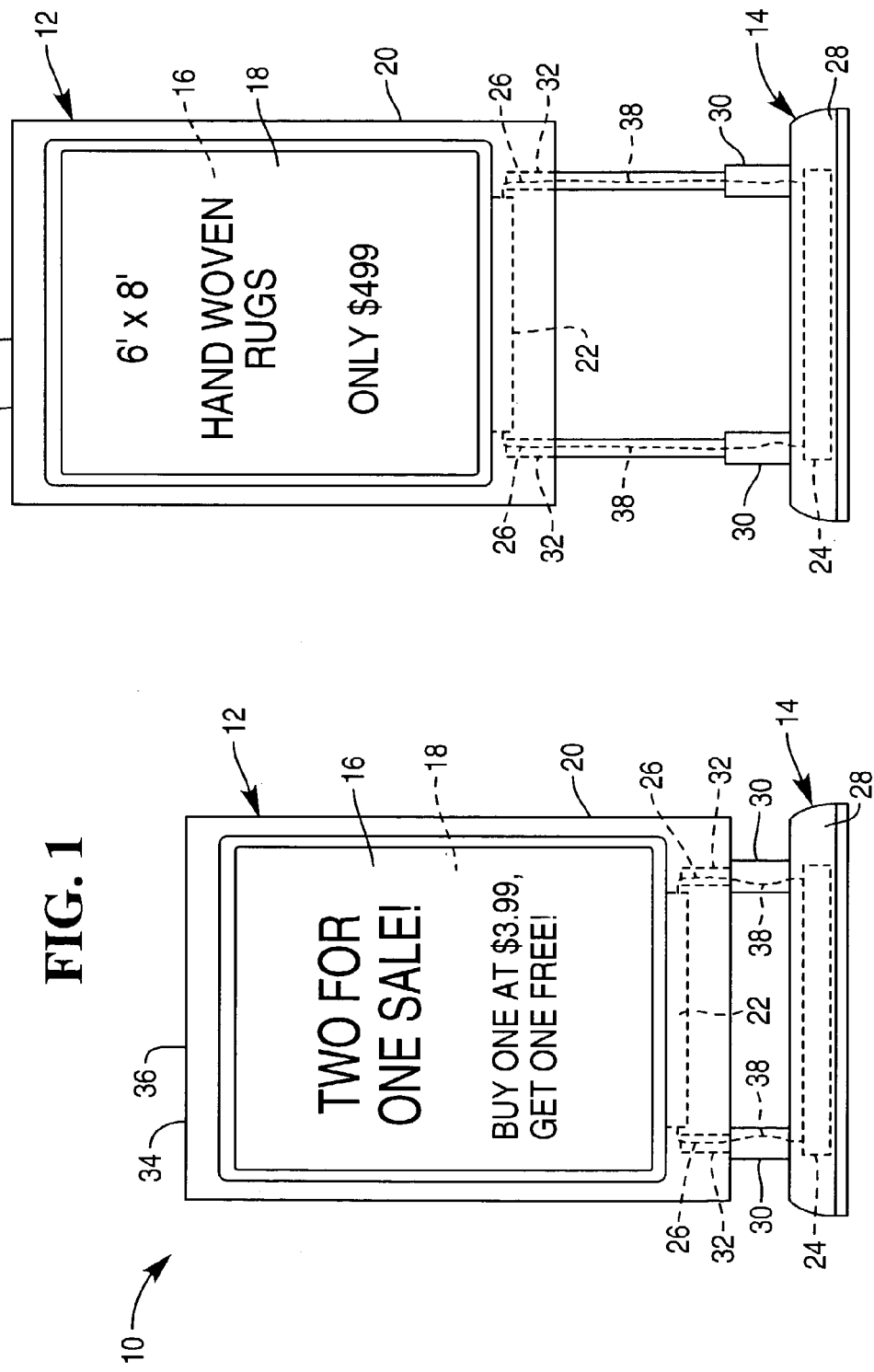

ELECTRONIC SIGN WITH OPPOSITELY FACING ELECTRONIC DISPLAYS

BACKGROUND OF THE INVENTION

The present invention relates to electronic signage and displays controlled by radio frequency (RF) signals, and more specifically to an electronic sign.

Food and general merchandise stores use large signs to promote their products. For example, grocery stores typically include displays for products grouped at the ends of aisles.

It would be desirable if these signs were electronic in order to more easily change the displayed information and to reduce labor costs associated with changing the signs.

SUMMARY OF THE INVENTION

In accordance with the teachings of the present invention, an electronic sign is provided.

The electronic sign includes a frame, first and second displays in the frame which face opposite directions, a base for supporting the frame, and control circuitry for causing the first and second displays to display information.

It is accordingly an object of the present invention to provide an electronic sign.

It is another object of the present invention to provide an electronic sign whose displayed information is easily changed via radio frequency (RF) communication.

It is another object of the present invention to provide an electronic sign which includes a display that is easily removed.

It is another object of the present invention to provide an electronic sign which includes a two-sided display.

It is another object of the present invention to provide an electronic sign which includes a stand which is adjustable in height.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 1 is a front view of the electronic sign;

FIG. 2 is a front view of the electronic sign configured with longer legs;

DETAILED DESCRIPTION OF THE PREFERRED EMBODIMENT

Figure 3:
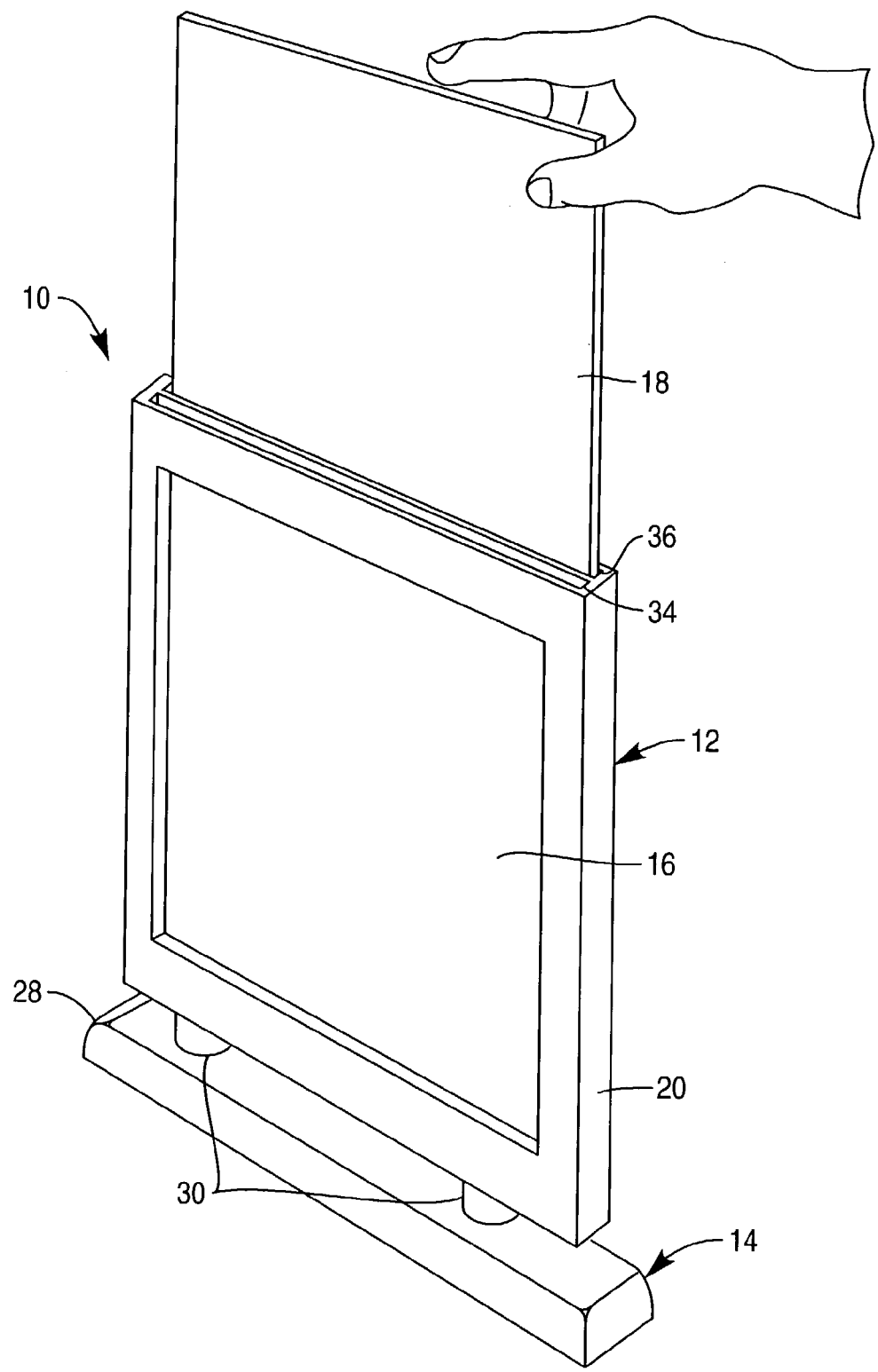
FIG. 3 is a perspective view of the electronic sign, showing insertion of a display.

Referring now to FIGS. 1–3, electronic sign 10 includes display portion 12 and base portion 14.

Display portion 12 includes front and rear displays 16 and 18, and frame 20.

Front and rear displays 16 and 18 display promotional information, such as price information. Front and rear displays 16 and 18 may simultaneously display the same or different information.

Front and rear displays 16 and 18 may include liquid crystal displays (LCDs). Alternatively, front and rear displays 16 and 18 may include single sheets of electronic paper, such as the type provided by Gyricon, or electronic ink for signage display purposes.

Front and rear displays 16 and 18 slide into frame portion 20, from a side or the top of frame 20. FIG. 3 illustrates insertion from the top of frame 20. Frame portion 12 includes apertures 34 and 36 for receiving front and rear displays 16 and 18.

Front and rear displays 16 and 18 couple to connector 22 in frame 20. Connector 22 couples to communication and control circuitry 24 within base portion 14.

Frame portion 20 includes holes 32 for receiving legs 26 of base portion 14.

Base portion 14 includes foot section 28 which supports frame portion 12. Foot section 28 is wide enough to provide a level of stability against falling over.

Base portion 14 also includes legs 26 and leg supports 30. Bottom ends of legs 26 are inserted into leg supports 30. Top ends of legs 26 are inserted into holes 26 within frame portion 20.

Legs 26 may vary in length. FIG. 2 shows a version of electronic sign 10 with longer legs 26.

Legs 26 are hollow to facilitate passage of wiring 38 from connector 22 to communication and control circuitry 24.

Figure 4:
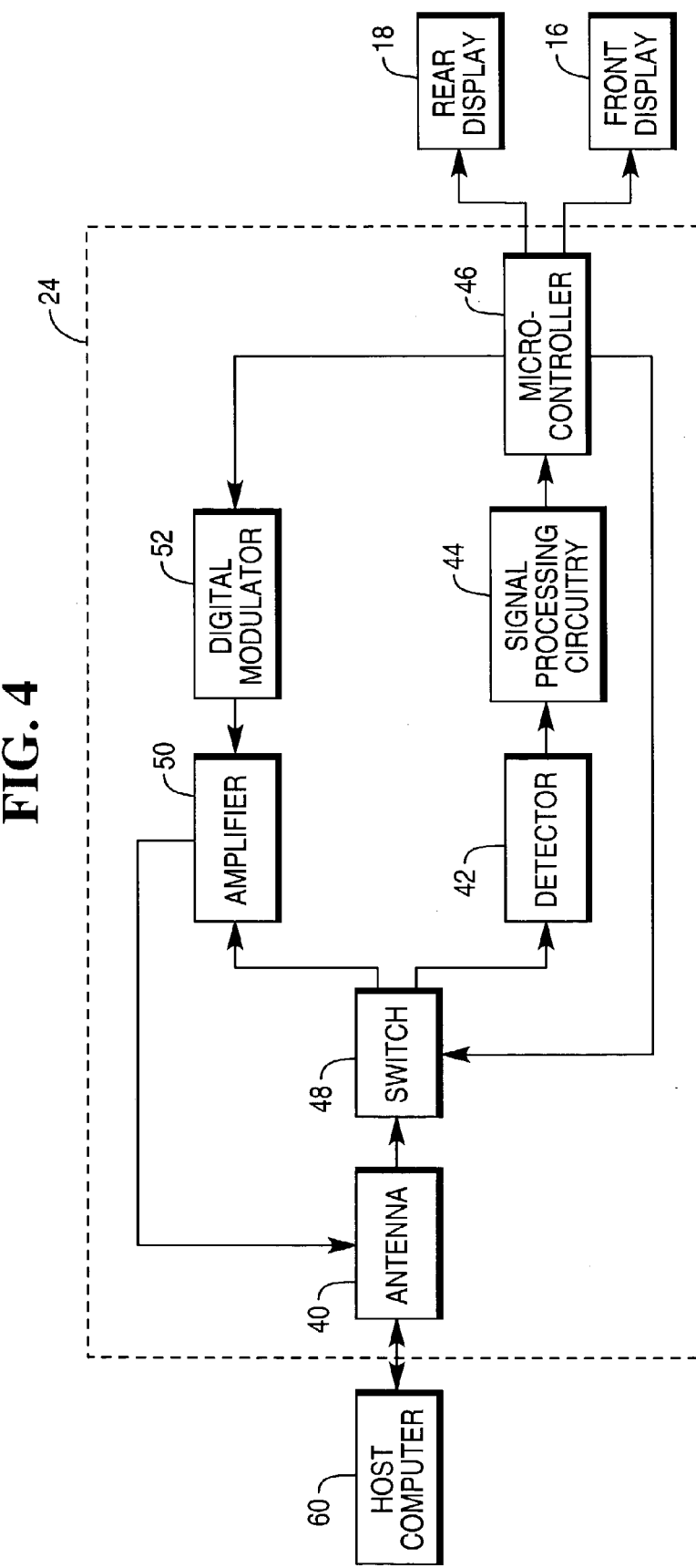
FIG. 4 is a block diagram of communication and control circuitry of the electronic sign.

Turning now to FIG. 4, communication and control circuitry 24 is shown in more detail. Electronic sign 10 receives price and other promotional information from host computer 60.

Communication and control circuitry 24 primarily includes antenna 40, detector 42, signal processing circuitry 44, and microcontroller 46.

Antenna 40 receives and transmits modulated RF signals. Antenna 40 is preferably a quarter-wave folded planar conductor which operates around a carrier frequency of 2.45 GHz.

Reception of downlink signals is similar to the method disclosed in commonly assigned U.S. Pat. No. 5,668,560. This patent is hereby incorporated by reference.

Detector 42 extracts an information signal from a modulated downlink carrier signal. Detector 42 is preferably a Schottky barrier-type silicon diode.

Signal processing circuitry 44 amplifies and demodulates the detected downlink signal to produce a downlink information signal.

Microcontroller 46 identifies on/off keyed data bits in the downlink information signal to generate data for display by display 14. Microcontroller 46 also provides an uplink information signal.

Communication circuitry 24 may additionally include switch 48, amplifier 50, and digital modulator 52.

Switch 48 routes the downlink signal to amplifier 50. Switch 48 is controlled by microcontroller 46.

Amplifier 50 amplifies an uplink signal from digital modulator 52. Amplifier 50 is powered by energy in the 2.45 carrier signal of the downlink signal.

Digital modulator 52 produces the uplink signal from an uplink information signal provided by microcontroller 46. Microcontroller 46 activates switch 48 to cause amplification and transmission of the uplink signal from digital modulator 52. Microcontroller 46 may be programmed to activate switch 48 if sign 10 is placed in a location where unamplified passive communication is difficult. If microcontroller 46 does not cause switch 48 to route the incoming downlink signal to amplifier 50, the uplink signal goes to antenna 40 unamplified.

Although the present invention has been described with particular reference to certain preferred embodiments thereof, variations and modifications of the present invention can be effected within the spirit and scope of the following claims.

What is claimed is:

1. An electronic sign comprising: a frame; first and second displays in the frame which face opposite directions; a base for supporting the frame; a number of legs between the base and the frame; control circuitry in the base for causing the first and second displays to display information including a microcontroller; and electrical connector in the frame for connecting the first and second displays in the frame to the control circuitry in the base.

2. The electronic sign as recited in claim 1, wherein the number comprises two.

3. The electronic sign as recited in claim 1, wherein the legs are hollow to facilitate passage for wires between the first and second displays and the control circuitry.

4. The electronic sign as recited in claim 1, wherein the legs are interchangeable with other legs of different heights.

5. The electronic sign as recited in claim 1, wherein the first and second displays display promotional information.

6. The electronic sign as recited in claim 1, wherein the first and second displays display price information.

7. The electronic sign as recited in claim 1, wherein the first and second displays simultaneously display like information.

8. The electronic sign as recited in claim 1, wherein the first and second displays simultaneously display different information.

9. The electronic sign as recited in claim 1, wherein the first and second displays comprise liquid crystal displays.

10. The electronic sign as recited in claim 1, wherein the first and second displays comprise electronic paper displays.

11. The electronic sign as recited in claim 1, wherein the frame comprises first and second apertures for facilitating insertion of the first and second displays into the frame.

12. The electronic sign as recited in claim 11, wherein the first and second apertures are located on top of the frame.

13. The electronic sign as recited in claim 11, wherein the first and second apertures are located on a side of the frame.

14. The electronic sign as recited in claim 1, wherein the control circuitry comprises wireless communication circuitry for obtaining the information from a host computer.

15. An electronic sign comprising:
a frame;
first and second displays in the frame which face opposite directions;
a base for supporting the frame;
a number of legs between the base and the frame;
control circuitry in the base for causing the first and second displays to display information including a microcontroller; and
an electrical connector in the frame for connecting the first and second displays in the frame to the control circuitry in the base.

16. An electronic sign comprising:
a frame;
first and second displays in the frame which face opposite directions;
a base for supporting the frame;
a number of legs between the base and the frame;
control circuitry in the base for causing the first and second displays to display information including a microcontroller;
an electrical connector in the frame for connecting the first and second displays in the frame to the control circuitry in the base; and
wireless communication circuitry in the base coupled to the control circuitry for obtaining the information from a host computer.

17. The electronic sign as recited in claim 16, wherein the wireless communication circuitry comprises modulated backscatter communication circuitry.

18. The electronic sign as recited in claim 16, wherein the wireless communication circuitry comprises:
an antenna for receiving and transmitting modulated radio frequency signals;
a detector for extracting an information signal from a modulated downlink carrier signal; and
signal processing circuitry for amplifying and demodulating a detected downlink carrier signal to produce a downlink information signal;
wherein the control circuitry obtains the information from the downlink information signal.

19. The electronic sign as recited in claim 16, wherein the wireless communication circuitry-further comprises:
a digital modulator, wherein the control circuitry generates an uplink information signal and the digital modulator produces an uplink signal from the uplink information signal;
an amplifier coupled to the digital modulator for routing the uplink signal to the antenna; and
a switch coupled to the antenna for routing the modulated downlink carrier signal either to the amplifier or to the detector under the control of the control circuitry;
wherein activation of the switch by the control circuitry causes the amplifier to amplify the uplink signal.

20. An electronic sign comprising:
a frame having a first end containing first and second adjacent apertures and a second end;
first and second electronic displays for displaying information about a product, wherein the electronic displays face in opposite directions and are slidably inserted into the frame through the apertures;
an electrical connector in the second end of the frame, wherein the electronic displays couple to the electrical connector after insertion of the electronic displays into the frame;
a base for supporting the frame;
a number of hollow legs between the base and the frame;
control circuitry in the base for causing the first and second electronic displays to display information including a microcontroller;
cables extending through the hollow legs for coupling the control circuitry in the base to the electrical connector in the frame; and
wireless communication circuitry in the base and coupled to the control circuitry for obtaining the information from a host computer including
an antenna for receiving and transmitting modulated radio frequency signals;
a detector for extracting an information signal from a modulated downlink carrier signal; and
signal processing circuitry for amplifying and demodulating a detected downlink carrier signal to produce a downlink information signal;
wherein the control circuitry obtains the information from the downlink information signal;
a digital modulator, wherein the control circuitry generates an uplink information signal and the digital modulator produces an uplink signal from the uplink information signal;
an amplifier coupled to the digital modulator for routing the uplink signal to the antenna; and
a switch coupled to the antenna for routing the modulated downlink carrier signal either to the amplifier or to the detector under the control of the control circuitry;
wherein activation of the switch by the control circuitry causes the amplifier to amplify the uplink signal.

* * * * *